United States Patent
Shen et al.

(10) Patent No.: US 10,580,209 B2
(45) Date of Patent: Mar. 3, 2020

(54) REMOVAL OF DEGENERATED SUB-PRIMITIVES IN TESSELLATION

(71) Applicant: QUALCOMM Incorporated, San Diego, CA (US)

(72) Inventors: Li Shen, San Diego, CA (US); Gang Zhong, San Diego, CA (US); Yan Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 15/913,480

(22) Filed: Mar. 6, 2018

(65) Prior Publication Data

US 2019/0279421 A1 Sep. 12, 2019

(51) Int. Cl.
*G06T 17/20* (2006.01)
*G06T 17/10* (2006.01)

(52) U.S. Cl.
CPC .............. *G06T 17/20* (2013.01); *G06T 17/10* (2013.01)

(58) Field of Classification Search
CPC ............................... G06T 17/20; G06T 17/205
See application file for complete search history.

(56) References Cited

U.S. PATENT DOCUMENTS

| | | | | |
|---|---|---|---|---|
| 5,261,029 A | * | 11/1993 | Abi-Ezzi | ............. G06T 17/20 345/419 |
| 5,689,577 A | * | 11/1997 | Arata | ................. G06T 17/20 345/423 |
| 6,222,556 B1 | | 4/2001 | Penna | |
| 7,307,628 B1 | * | 12/2007 | Goodman | ............... G06T 15/40 345/421 |
| 8,243,070 B1 | * | 8/2012 | Brown | .................... G06T 17/20 345/423 |
| 9,330,495 B2 | | 5/2016 | Goel et al. | |
| 2010/0164955 A1 | * | 7/2010 | Sathe | ...................... G06T 17/20 345/423 |
| 2011/0057931 A1 | * | 3/2011 | Goel | ....................... G06T 17/20 345/423 |
| 2011/0310102 A1 | * | 12/2011 | Chang | .................... G06T 17/20 345/423 |
| 2012/0229464 A1 | * | 9/2012 | Fishwick | ............... G06T 17/20 345/423 |
| 2013/0120380 A1 | | 5/2013 | Kallio et al. | |

(Continued)

OTHER PUBLICATIONS

Gelas et al., "Variational implicit surface meshing", 2009, Computers & Graphics 33, pp. 312-320 (Year: 2009).*

(Continued)

*Primary Examiner* — Phong X Nguyen
(74) *Attorney, Agent, or Firm* — Shumaker & Sieffert, P.A.

(57) ABSTRACT

This disclosure describes a method and apparatus for performing tessellation in a graphics process. A graphics processing unit may be configured to determine tessellation factors for a first patch of the graphics data, determine, based on the tessellation factors, that a first edge of an outermost ring of the first patch will produce only degenerated sub-primitives, and skip performing tessellation for the first edge. A graphics processing unit may determine that a second edge of the outermost ring of the first patch will produce at least some normal sub-primitives, and perform tessellation for the second edge to produce output primitives.

25 Claims, 7 Drawing Sheets

(56) References Cited

U.S. PATENT DOCUMENTS

| | | | |
|---|---|---|---|
| 2014/0063014 A1* | 3/2014 | Goel | G06T 1/60 |
| | | | 345/423 |
| 2014/0111513 A1* | 4/2014 | Ceylan | G06T 17/20 |
| | | | 345/423 |
| 2014/0320523 A1* | 10/2014 | Hodsdon | G06T 17/20 |
| | | | 345/611 |
| 2015/0260016 A1* | 9/2015 | Fung | E21B 41/00 |
| | | | 703/10 |
| 2015/0260017 A1* | 9/2015 | Ding | E21B 43/00 |
| | | | 703/10 |
| 2016/0148424 A1 | 5/2016 | Chung et al. | |
| 2016/0358373 A1* | 12/2016 | Fenney | G06T 17/205 |
| 2016/0358375 A1* | 12/2016 | Lacey | G06T 17/20 |
| 2019/0019331 A1* | 1/2019 | Alliez | G06F 17/17 |

OTHER PUBLICATIONS

Niebner et al., "Analytic Displacement Mapping Using Hardware Tessellation", 2013, ACM Trans. Graph. 32, 3, Article 26, pp. 26:1-26:9 (Year: 2013).*

Dyken C., et al., "Semi-uniform Adaptive Patch Tessellation," General-Purpose Computation on Graphics Hardware, Aug. 4, 2008, 9 Pages.

\* cited by examiner

REMOVAL OF DEGENERATED SUB-PRIMITIVES IN TESSELLATION

TECHNICAL FIELD

This disclosure relates to techniques for graphics processing, and more specifically to techniques for tessellation in graphics processing.

BACKGROUND

Visual content for display, such as content for graphical user interfaces and video games, may be generated by a graphics processing unit (GPU). A GPU may convert two-dimensional or three-dimensional (3D) objects into a two-dimensional (2D) pixel representation that may be displayed. Converting information about 3D objects into a bit map that can be displayed is known as pixel rendering, and requires considerable memory and processing power. In the past, 3D graphics capability was available only on powerful workstations. However, now 3D graphics accelerators are commonly found in personal computers (PC), and are embedded in other devices, such as smart phones, tablet computers, portable media players, portable video gaming consoles, and the like. Typically, 3D graphics accelerators in mobile device have less computational power and memory capacity as compared to 3D graphics accelerators in conventional PCs. As such, increased complexity in 3D graphics rendering techniques presents difficulties when implementing such techniques on an embedded system.

SUMMARY

In general, this disclosure describes techniques for graphics processing, and in particular, techniques for tessellation performed during graphics processing. In some examples, when tessellating a patch of graphics data, a graphics processing unit may produce only degenerated sub-primitives along an edge of the patch. A degenerated sub-primitive is a sub-primitive (e.g., a triangle) with at least two vertices having the same (u,v) coordinate and will not contribute to the final scene. Performing further processing on such degenerated sub-primitives may be wasteful of both processing cycles and power.

In accordance with example techniques of this disclosure, a graphics processing unit or other processor may be configured to analyze tessellation parameters for a patch of graphics data. The graphics processing unit may determine, based on the analysis of the tessellation parameters, that performing tessellation along an edge of a patch will produce only degenerated sub-primitives. Based on the determination, the graphics processing unit may skip performing tessellation for the edge of the patch of graphics data that will only produce degenerated sub-primitives. In the context of this disclosure, skipping performing tessellation for an edge of a patch may include bypassing tessellation circuitry for an edge of a patch (e.g., a tessellator connectivity and point generator) and proceeding to processing the next edge of the patch and/or proceeding to the next stage of a graphics processing pipeline. In other examples, skipping performing tessellation for an edge of a patch may include not performing tessellation for an edge of a patch, marking an edge of a patch to indicate the edge should not be processed by the tessellator, and/or determining to not apply tessellation to the edge of the patch based on the marking associated with the edge. For edges that are tessellated, the graphics processing unit may further analyze the output sub-primitives and discard any remaining degenerated sub-primitives. In this way, further processing of degenerated sub-primitives will be avoided.

In one example of the disclosure, a method for tessellation includes determining tessellation factors for a first patch, determining, based on the tessellation factors, that a first edge of an outermost ring of the first patch will produce only degenerated sub-primitives, and skipping performing tessellation for the first edge.

In another example of the disclosure, an apparatus configured for graphics processing includes a memory configured to store graphics data, and one or more processors configured to process the graphics data, the one or more processors configured to determine tessellation factors for a first patch of the graphics data, determine, based on the tessellation factors, that a first edge of an outermost ring of the first patch will produce only degenerated sub-primitives, and skip performing tessellation for the first edge.

In another example of the disclosure, an apparatus configured for graphics processing includes means for determining tessellation factors for a first patch, means for determining, based on the tessellation factors, that a first edge of an outermost ring of the first patch will produce only degenerated sub-primitives, and means for skipping performing tessellation for the first edge.

In another example, this disclosure describes a computer-readable storage medium storing instructions that, when executed, causes one or more processors of a device for graphics processing to determine tessellation factors for a first patch of the graphics data, determine, based on the tessellation factors, that a first edge of an outermost ring of the first patch will produce only degenerated sub-primitives, and skip performing tessellation for the first edge.

The details of one or more examples are set forth in the accompanying drawings and the description below. Other features, objects, and advantages will be apparent from the description and drawings, and from the claims.

DETAILED DESCRIPTION

Some graphics processing pipelines, including rendering pipelines operating according to Microsoft DirectX® application programming interface (API) developed by Microsoft® or the OpenGL® API developed by the Khronos Group™, include additional processing stages that allow for tessellation of graphics primitives. Tessellation is the process by which graphics primitives are divided into smaller graphics primitives (e.g., called sub-primitives), thus allowing for finer detail in the displayed image.

In some examples, when tessellating a patch of graphics data, a processor (e.g., a graphics processing unit (GPU)) may produce degenerated sub-primitives along an edge of a patch. A degenerated sub-primitive is a sub-primitive (e.g., a triangle or a quad) with at least two vertices having the same (u,v) coordinate. A degenerated sub-primitive will not contribute to the final scene unless the coordinates for the degenerated sub-primitive are altered by another stage of a graphics processing pipeline (e.g., a geometry shader). Performing further processing on such degenerated sub-primitives whose coordinates will not be further altered may be wasteful of both processing cycles and power.

In accordance with example techniques of this disclosure, a graphics processing unit or other processor may be configured to analyze tessellation parameters for a patch of graphics data. The graphics processing unit may determine, based on the analysis of the tessellation parameters, that performing tessellation along an edge of a patch will produce only degenerated sub-primitives. Based on the determination, a graphics processing unit, in accordance with an example of this disclosure, may skip performing tessellation for the edge of the patch of graphics data that will only produce degenerated sub-primitives. For edges that are tessellated, the graphics processing unit may further analyze the output sub-primitives and discard any remaining degenerated sub-primitives. In this way, further processing of degenerated sub-primitives will be avoided.

Figure 1:
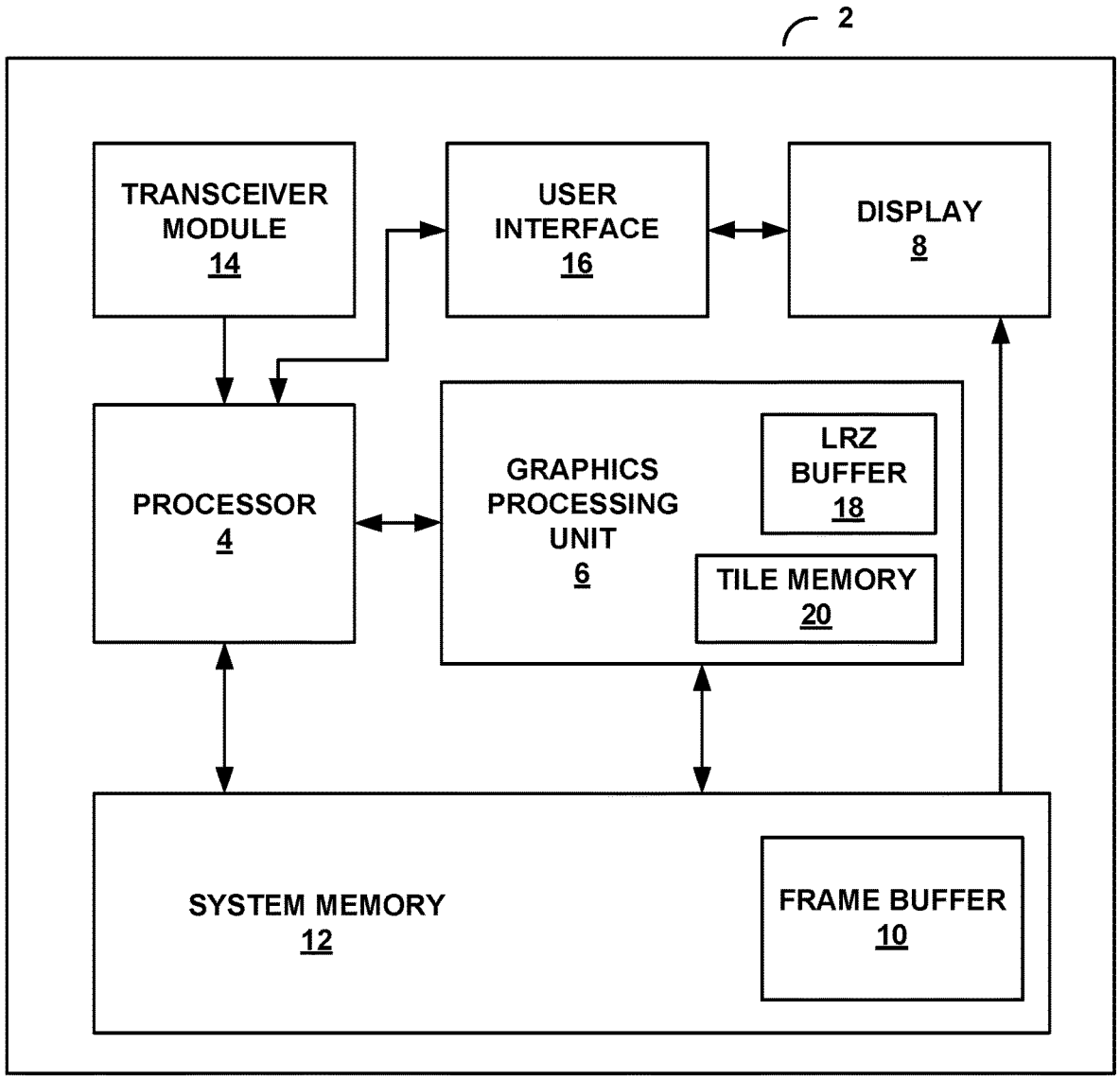
FIG. 1 is a block diagram illustrating an example graphics processing system.

FIG. 1 is a block diagram illustrating a device 2 that may be configured to implement the tessellation techniques of this disclosure. Examples of device 2 include, but are not limited to, mobile telephones (e.g., smartphones), personal digital assistants (PDAs), portable media players, video gaming consoles (with or without integrated displays), mobile video conferencing units, laptop computers, desktop computers, television set-top boxes, tablet computing devices, e-book readers, and other types of wired or wireless devices. Device 2 may include processor 4, graphics processing unit (GPU) 6, display 8, frame buffer 10, system memory 12, transceiver module 14, and user interface 16. Device 2 may include additional modules or units not shown in FIG. 1 for purposes of clarity. For example, device 2 may include a speaker and a microphone, neither of which are shown in FIG. 1, to effectuate playback and recording, and telephonic communications in examples where device 2 is a mobile telephone. Furthermore, the various modules and units shown in device 2 may not be necessary in every example of device 2. For example, user interface 16 and display 8 may be external to device 2 in examples where device 2 is a desktop computer or a video gaming console.

Processor 4 may execute one or more applications. Examples of the applications include graphical user interfaces, web browsers, e-mail applications, video games, or other applications that generate viewable objects for display. The one or more applications may be stored within system memory 12. In some instances, processor 4 may download the one or more applications via transceiver module 14 (e.g., from the Internet or other network). Processor 4 may execute the one or more applications based on a selection by a user via user interface 16. In some examples, processor 4 may execute the one or more applications without user interaction.

Examples of processor 4 include, but are not limited to, a digital signal processor (DSP), general purpose microprocessor, application specific integrated circuit (ASIC), field programmable logic array (FPGA), central processing unit (CPU) or other equivalent integrated or discrete logic circuitry. System memory 12 may include one or more computer-readable storage media. Examples of system memory 12 include, but are not limited to, a random-access memory (RAM), a read only memory (ROM), an electrically erasable programmable read-only memory (EEPROM), a CD-ROM optical disc, a Blu-ray™ high-density optical disc or other optical disk storage, magnetic disk storage, or other magnetic storage devices, flash memory, or any other medium that can be used to carry or store desired program code in the form of instructions or data structures and that can be accessed by a computer or a processor. In some examples, system memory 12 may include instructions that cause host processor 4 and/or GPU 6 to perform the functions ascribed to host processor 4 and GPU 6 in this disclosure.

System memory 12 may, in some examples, be considered as a non-transitory storage medium. The term "non-transitory" may indicate that the storage medium is not embodied in a carrier wave or a propagated signal. However, the term "non-transitory" should not be interpreted to mean that system memory 12 is non-movable. As one example, system memory 12 may be removed from device 2, and moved to another device. As another example, a storage device, substantially similar to system memory 12, may be inserted into device 2. In certain examples, a non-transitory storage medium may store data that can, over time, change (e.g., in RAM).

Examples of user interface 16 include, but are not limited to, a trackball, a mouse, a keyboard, gaming controller and other types of input devices. User interface 16 may also be a touch screen and may be incorporated as a part of display 8. Transceiver module 14 may include circuitry to allow wireless or wired communication between device 2 and another device or a network. Transceiver module 14 may include modulators, demodulators, amplifiers and other such circuitry for wired or wireless communication.

In some examples, GPU 6 can be a dedicated processor designed to quickly manipulate data using a highly parallel structure. In particular, GPU 6 may be configured to execute programmable and fixed function stages of a graphics processing pipeline. In one example, GPU 6 may be configured to execute a three-dimensional graphics processing pipeline to render three-dimensional objects to two-dimensional space for display. For example, GPU 6 may perform functions such as shading, blending, illuminating, rendering, and others to generate pixel values for the pixels to be displayed on display 8. Pixels produced by GPU 6 may be stored in frame buffer 10 prior to display. In some examples, processor 4 and GPU 6 may be implemented in a single component (e.g., a single processor having one or more processing cores) that is configured to perform the functions of both processor 4 and GPU 6.

When rendering graphics as part of executing an application, processor 4 may be configured to transmit instructions and graphics data to GPU 6. In some examples, the graphics data may be in the form of vertices, which may include one or more data structures that describe a point in 2D or 3D space.

The application executing on processor 4 may communicate with GPU 6 in accordance with an API. For purposes of illustration and to ease with understanding, the techniques described in this disclosure are generally described in the context of the DirectX® and OpenGL® APIs. However, aspects of this disclosure should not be considered limited to the DirectX® and OpenGL® APIs, and the techniques described in this disclosure may be extended to other APIs as well.

APIs, such as DirectX® and OpenGL®, can define graphics processing pipelines that may be implemented by GPU

6. These graphics processing pipelines may include a combination of programmable stages, as well as fixed-function stages. Some versions of the APIs, such as the Direct3D® 11 API and the OpenGL® 4.x API, include a tessellation process that is to be performed by the GPU.

Although one GPU 6 is illustrated in FIG. 1, aspects of this disclosure are not so limited. In some examples, device 2 may include multiple GPUs or GPU cores, similar to GPU 6. The graphics processing tasks may be split among these GPUs or GPU cores.

In some examples, GPU 6 may be configured to render a frame for display using a direct rendering mode. For a direct rendering mode, GPU 6 may be configured to render all primitives of the frame in a single pass. However, in some instances, to be performed efficiently, direct rendering may utilize more memory than is quickly accessible by certain GPUs. For example, mobile devices, e.g., mobile telephones, may include GPUs that only have a small amount of memory that is quickly accessible by the GPU (sometimes called graphics memory or GMEM) compared to other device, e.g., desktop computers. The small amount of memory may be insufficient to be effective for direct rendering in certain cases. Accordingly, when implemented in a mobile device, GPU 6 may be configured to render a scene using a tile-based rendering mode. A scene may be defined as a virtual 3D space containing objects to be drawn from a certain viewpoint (e.g., a camera or user viewpoint).

Figure 2:
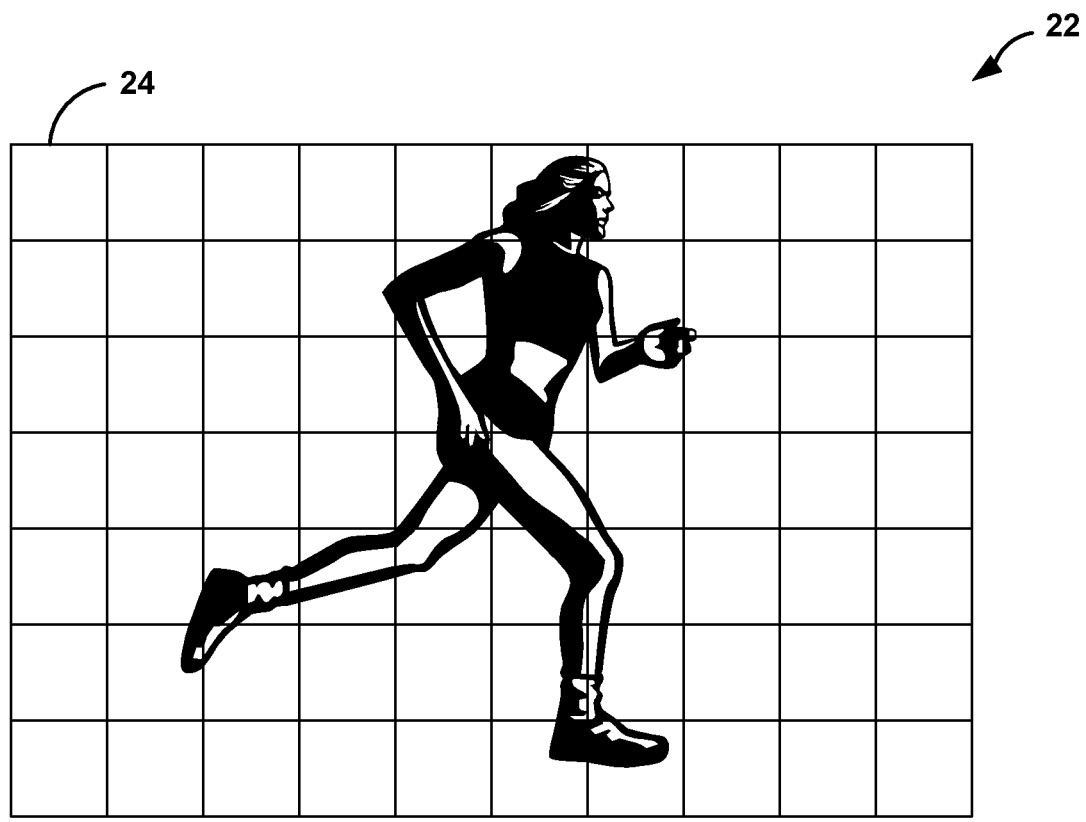
FIG. 2 is a diagram illustrating example tiles of a frame in a tile-based rendering architecture.

Tile-based rendering (sometimes referred to as binning) renders one frame (e.g., a 2D view from a particular viewpoint) of a 3D scene by breaking the frame into smaller parts (e.g., rectangular tiles of pixels) and rendering each of these parts separately. A frame may be the same size as a display or may be any size smaller than a display (e.g., a window in a graphical user interface). FIG. 2 is a conceptual diagram illustrating tiles of a frame in a tile-based rendering architecture. Frame 22 may be divided into tiles, including, for example, tile 24. GPU 6 may then render frame 22 on a per-tile basis to render the entire frame. Prior to rendering a frame, GPU 6 may perform a binning pass, also referred to as a tiling function. The binning pass determines which primitives of the 3D scene are in each tile of the frame. In some examples, a binning pass may also determine which primitives of the 3D scene will actually be visible when rendered. In this way, invisible primitives may not need to be rendered.

Returning to FIG. 1, for executing a binning pass, GPU 6 may divide the pixels on display 8 into tiles, as is shown in FIG. 2. For example, assume that display 8 is configured to include 640×480 pixels. As one example, GPU 6 may divide the display into 10×10 tiles, where each tile includes 64×48 pixels.

Tile memory 20 may be used to store data that indicates the particular tiles to which an image surface (e.g., the 2D image of the 3D scene) belongs, during the binning pass. In some examples, tile memory 20 may be formed as a part of system memory 12, although aspects of this disclosure are not so limited. GPU 6 may store an identifier for an image surface within appropriate storage locations of tile memory 20 based on tiles to which the image surface belongs, during the binning pass for that image surface. Tile memory 20 may be considered as including multiple layers. Each layer may correspond to one of the image surfaces. Each layer may be a two-dimensional layer that includes multiple storage locations. Each storage location may correspond to one of the tiles of display 8.

Low resolution Z buffer (LRZ buffer) 18 may be a two-dimensional buffer with multiple storage locations. In some examples, LRZ buffer 18 may be part of GPU 6 or part of system memory 12, although aspects of this disclosure are not so limited. LRZ buffer 18 may promote efficient indication of which pixels should be rendered to avoid unnecessarily rendering pixels that are subsequently occluded (e.g., invisible in the finally rendered scene). Each storage location in LRZ buffer 18 may correspond to a block of pixels represented on display 8. For instance, a block of 4×4 pixels represented on display 8 may correspond to one storage location in LRZ buffer 18. A block of 4×4 pixels is provided for purposes of illustration and should not be considered as limiting. LRZ buffer 18 may be considered as a low-resolution buffer because each storage location of LRZ buffer 18 corresponds to a plurality of pixels, rather than a single pixel.

In examples of this disclosure, GPU 6 may be configured to execute a graphics processing pipeline that includes tessellation. The tessellation process refers to dividing a primitive (also referred to as patch in the context of tessellation) into a plurality of smaller sub-primitives (e.g., triangles), and interconnecting the sub-primitives together. To perform tessellation, GPU 6 may be configured to compute new vertex values (e.g., position, color, texture coordinates, etc.) for each of the vertices of the sub-primitives generated by this process. The tessellation process can result in a more highly detailed surface, as compared to the surface prior to tessellation. Tessellation allows the application executing on processor 4 to define the surface with low resolution, which may require few points, and allows GPU 6 to generate a higher resolution surface.

As will be explained in more detail below, GPU 6 may be configured to determine tessellation factors for a first patch of the graphics data, determine, based on the tessellation factors, that a first edge of an outermost ring of the first patch will produce only degenerated sub-primitives, and skip performing tessellation for the first edge. In this way, the production of degenerated sub-primitives may be avoided.

Figure 3:
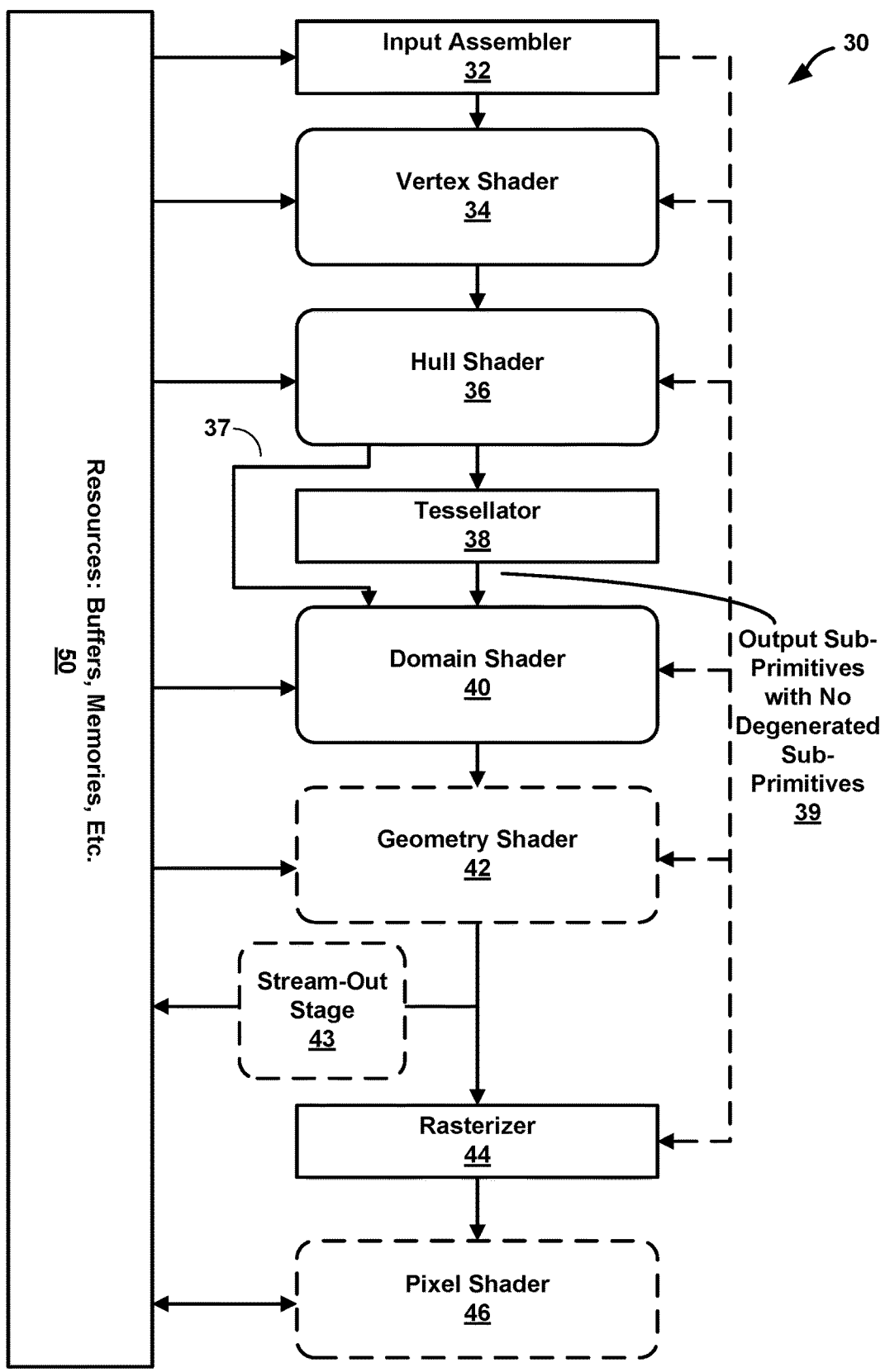
FIG. 3 is a block diagram illustrating an example graphics processing pipeline using tessellation.

FIG. 3 depicts an example graphics processing pipeline 30 that may be executed by GPU 6 of FIG. 1. As described above, GPU 6 may be configured to apply a tessellation process to a patch. A patch may be considered as a specialized type of a primitive. Graphics processing pipeline 30 may be configured to operate on patches when the tessellation is enabled. When tessellation is disabled, graphics processing pipeline 30 may be configured to operate on other primitive types (e.g., points, lines, triangles, quads, etc.). Tessellation may not be desired for all applications, and a developer may not include tessellation as a process to be performed by graphics processing pipeline 30. In other examples, tessellation may be a configurable operation and may be enabled or disabled by a user (e.g., tessellation may be disabled during a lower quality rendering setting).

A patch is defined by one or more control points that together with a mathematical formula (e.g., a formula defining a Bezier curve or a formula defining another shape) define a portion of a surface. For example, an object, such as a sphere, may be divided into multiple surfaces. In this example, the surfaces may be curved surfaces that, when combined, form the sphere. Each one of the surfaces may be divided into one or more patches, where each of the patches is defined by one or more control points. The control points may be defined by coordinates. There may be any number of control points in a patch. For instance, in some examples, the number of control points in a patch may be between 1 and 32 control points. The number of control points in a patch may be fixed or user defined.

The control points and mathematical formula that define a patch of a surface may define a mathematically smooth surface. The level of detail obtained when tessellating a patch is determined by the tessellation factors used. For example, referring back to the example of the sphere, if tessellation factors for tessellating the sphere are relatively small (e.g., relatively few triangle sub-primitives are generated), the sphere would appear jaggy with stair step like points, rather than a smooth curved surface. If tessellation factors for tessellating the sphere are relatively large (e.g., relatively more triangle sub-primitives are generated), the sphere would appear less jaggy and more smooth.

The tessellation process, in accordance with examples of the DirectX® API and the OpenGL® 4.x API, may use two shader processors and a fixed-function unit. A shader is a software application that executes on a programmable shader processor (or shader core) of the GPU and provides substantial functional flexibility. The fixed-function unit is a hardwired logic unit that performs fixed functions and may provide limited functional flexibility. However, it may be possible to implement the functions of the fixed-function unit using a programmable shader coder to provide additional functional flexibility.

As will be explained in more detail below, in some instances (e.g., when using the DirectX® API), a graphics processing pipeline that is configured to implement tessellation includes a hull shader coupled to a tessellator stage, which is coupled to a domain shader. The hull shader and the domain shader may form the two shader processors of the tessellation process, and the tessellator stage may form the fixed-function unit of the tessellation process. The other stages in the graphics processing pipeline are similar to those in APIs that do not implement the tessellation process.

In some instance (e.g., when using the OpenGL® 4.x API), a graphics processing pipeline that is configured to implement the tessellation process includes a tessellation control shader (TCS) coupled to a primitive generator, which is coupled to a tessellation evaluation shader (TES). The tessellation control shader and the tessellation evaluation shader may form the two shader processors of the tessellation process, and the primitive generator may form the fixed-function unit of the tessellation process. The TCS is analogous to the hull shader and the TES is analogous to the domain shader of a DirectX® API. The primitive generator is analogous to the fixed-function tessellator of the DirectX® API.

The techniques described in this disclosure are generally related to the operation of GPU 6 when performing tessellation. For purposes of brevity, this application will describe an example with reference to the DirectX® API. However, it should be understood that the techniques of this disclosure may be used in conjunction with any APIs or GPU architectures that implement tessellation. Furthermore, it should be understood that the techniques of this disclosure may be used in conjunction with any other type of processor or hardware unit configured to perform tessellation, including processor 4.

In the example of FIG. 3, GPU 6 may be configured to include graphics processing pipeline 30. Graphics processing pipeline 30 may include one or more fixed-function units and one or more programmable units. In some examples, graphics processing pipeline 30 may be implemented according to Microsoft's DirectX® 11 API. As shown in the example of FIG. 3, graphics processing pipeline 30 includes three tessellation stages: a programmable hull shader 36, a fixed-function tessellator 38, and a programmable domain shader 40. The hull shader 36, tessellator 38, and domain shader 40 are sometimes referred together as the "tessellation pipeline."

Input assembler 32 is configured to read primitive data (e.g., vertices for points, lines, triangles, and/or control points for patches) from memory and assemble the data into primitives that may be used at further stages of graphics processing pipeline 30. The primitive data may be stored in a memory of resources 50 (e.g., tile memory 20 of FIG. 2). Resources may include buffers, memories, and/or other sources of graphics data that may be used by the stages of graphics processing pipeline 30. Input assembler 32 may be configured to assemble the vertices and/or control points into different primitive types. In some examples, the basic primitive for a graphics processing pipeline is a point, line, and/or triangle. For graphics processing pipelines that include a tessellation stage, like graphics processing pipeline 30, the basic primitive may be a patch. As described above, a patch is a representation of a surface. In some examples, a patch may include between 1 to 32 different control points to define the surface. Input assembler 32 outputs the primitives to vertex shader 34.

Vertex shader 34 is a programmable processor that is configured to process vertices and/or control points of the primitives received from input assembler 32. For example, vertex shader 34 may be configured to perform per-vertex operations and/or per-control-point operations, such as space transformations, skinning, morphing, and per-vertex lighting. In some examples, vertex shader 34 does not produce additional vertices or control points. Rather, vertex shader 34 may be configured to operate on a single input vertex of a primitive and produce a single output vertex for the primitive. Likewise, vertex shader 34 may be configured to operate on a single input control point of a patch and produce a single output control point for the patch. When performing a 3D space to 3D space transformation, vertex shader 34 may perform rotation, scaling, and translation. When performing a 3D space to 2D space transformation, vertex shader 34 may perform a so-called projection transformation.

In some examples, vertex shader 34 may receive control points of a patch. Vertex shader 34 is configured to perform operations on control points of the patch. Vertex shader 34 is configured to manipulate properties such as position, color, and texture coordinate, but does not create new control points for a patch. In some embodiments, such as when the tessellation pipeline is disabled, vertex shader 34 may also perform a transformation from 3D to 2D space. When configured with a tessellation pipeline, domain shader 40 of graphics processing pipeline 30 may be configured to perform the final transformation from 3D space to 2D space.

When graphics processing pipeline 30 is not configured to perform tessellation, vertex shader 34 may output processed vertices of primitives (e.g., points, lines or triangles) to optional geometry shader 42 or to rasterizer 44. Hull shader 36, tessellator 38, and domain shader 40 are bypassed.

When graphics processing pipeline 30 is configured to perform tessellation, vertex shader 34 passes the output control points to hull shader 36. Hull shader 36 is configured to determine parameters for tessellation (e.g., partition type, patch type, and tessellation factors). Hull shader 36 is responsible for ensuring continuity across adjacent patches. If there are two adjacent patches that have different levels of tessellation, hull shader 36 operations for the different patches output the tessellation parameters to tessellator 38 to ensure that the shared edge(s) between the patches use the same level of tessellation. Without this protection, gaps and breaks in what are supposed to be contiguous patches can occur.

Hull shader 36 may be configured to pass the transformed control points produced by vertex shader 34 to domain shader 40 via circuit 37. The control points of patches represent a more complex surface and may benefit from additional processing by hull shader 36 before being passed to domain shader 40. In this example, hull shader 36 may be configured to transform input control points that define a low-order surface into control points that make up a higher-resolution patch prior to tessellation.

Hull shader 36 may also determine tessellation parameters, such as patch type and partition type, and provide such information indicating such parameters to tessellator 38. As will be described below, patch types may include triangle patches and quad patches, though any shape patches may be used. The partitioning types for a patch may include fractional odd partitioning, fractional even partitioning, integer partitioning, and power of two partitioning. The partitioning types indicate how tessellation factors, which may be floating-point numbers, used for matching edges of adjacent patches are calculated. In fractional odd partitioning, tessellation factors are rounded to the nearest odd number (e.g., in the range 1 to 63). In fractional even partitioning, tessellation factors are rounded to the nearest even number (e.g., in the range 2 to 64). In integer partitioning, all floating-point tessellation factors are rounded up to the nearest integer (e.g., in the range 1 to 64). In power of two partitioning, tessellation factors are rounded to the nearest power of 2 (e.g., powers of 2 in the range 1 to 64).

Hull shader 36 also determines the level of tessellation to be performed on each patch. The level of tessellation may be referred to as tessellation factors (TFs). The values of the tessellation factors (e.g., sometimes called tessellation levels) determine how much to subdivide each patch. Hull shader 36 provides the TFs to tessellator 38. The amount of tessellation that is performed over a particular patch type is defined by inner tessellation factors and outer tessellation factors. The value of the tessellation factor defines how many segments an edge is tessellated into. For example, a tessellation factor of 4.0 means that an edge will become four edges (e.g., 2 vertices become 5). The outer tessellation factors define the tessellation for the outer edges of the primitive. A triangle patch will have three outer tessellation factors. A quad patch will have four outer tessellation factors.

The outer tessellation factors make it possible for two or more patches to properly connect, while still having different tessellation factors within the patch. The inner tessellation factors are for the number of tessellations within the patch. A triangle patch will have one inner tessellation factor. A quad patch will have two inner tessellation factors, one inner tessellation factor for each of the u direction and v direction in a (u,v) coordinate system.

The basic function of the tessellator 38 is to tessellate (i.e., subdivide) input primitives (e.g., patches) of a 3D scene into multiple output primitives (e.g., sub-primitives). Tessellator 38 generates additional points in (u,v) space on a so-called virtual patch to form sub-primitives. That is, tessellator 38 does not operate on the control points of the patch itself, but rather generates points for sub-primitives on a generic patch based on the tessellation factors and other tessellation parameters provided by hull shader 36. Tessellator 38 subdivides these patches into smaller output sub-primitives, such as triangles, quads or isolines in accordance with the tessellation factors provided by hull shader 36. The output of the tessellator 38 is a set of points in (u,v) space that define the output sub-primitives. Tessellation allows for rendering a smoother curved surface resulting in more graphically detailed images.

When tessellating a triangle patch, tessellator 38 may be configured to receive three outer tessellation factors (one for each edge of the triangle patch) and one inner tessellation factor. Tessellator 38 may be configured to subdivide the edges of a virtual triangle patch based on the inner tessellation factor. That is, tessellator 38 applies the inner tessellation factor to each edge of the virtual triangle patch. As will be shown and described with reference to the figures below, this creates rings of triangles in the virtual triangle patch. The outermost ring may be sometimes called a picture frame. The number of inner triangle rings is determined by the inner tessellation factor and the partitioning type. For example, for an inner tessellation factor of 2.0, if the partitioning type is fractional odd, there will be one inner ring of triangles. In another example, for an inner tessellation factor of 2.0, if the partitioning type is integer, there will be no inner ring. After producing any inner rings of triangles, tessellator 38 may then tessellate the outer edges of the virtual triangle patch into sub-primitives based on their respective outer tessellation factors.

When tessellating a virtual quad patch, tessellator 38 may be configured to receive four outer tessellation factors (one for each edge of the quad patch), and two inner tessellation levels (one for each of the u and v direction). For example, a first inner tessellation factor (TF0) may apply to the top and bottom edge of the virtual quad patch (u direction) and a second inner tessellation factor (TF1) may apply to the right and left edge of the virtual quad patch (v direction).

Tessellator 38 may be configured to subdivide the edges of the virtual quad patch based on the inner tessellation factor. That is, tessellator 38 applies the inner tessellation factor to each edge of the virtual quad patch. As will be shown and described with reference to the figures below, this creates rings of quads in the virtual quad patch. The outermost ring may be sometimes called a picture frame. After producing any inner rings of quads, tessellator 38 may then tessellate the outer edges of the virtual quad patch into sub-primitives based on their respective outer tessellation factors. As will be discussed in more detail below, using the techniques of this disclosure, tessellator 38 may be configured to generate output sub-primitives with no degenerated sub-primitives 39, which passes to domain shader 40.

Domain shader 40 operates on the output sub-primitives created by tessellator 38. Domain shader 40 may interpolate the position of the vertices of the sub-primitives from the points generated by tessellator 38 in (u,v) space and the control points provided by hull shader 36.

Geometry shader 42 is an optional programmable stage that may be used to create additional primitives from the tessellated output sub-primitives received from the tessellation pipeline (e.g., from domain shader 40). Geometry shader 42 allows for even more graphically detailed images.

Unlike vertex shaders, which operate on a single vertex of a primitive at a time, the inputs to geometry shader 42 are the vertices for a full primitive (two vertices for lines, three vertices for triangles, or a single vertex for a point). Geometry shader 42 can also bring in the vertex data for the edge-adjacent primitives as input (an additional two vertices for a line, an additional three for a triangle). Geometry shader 42 may be configured to change the position of any input primitives.

Stream-out stage 43 is another optional stage of graphics processing pipeline 30. Stream-out stage 43 may be configured to continuously output (or stream) vertex data from geometry shader 42 (or the domain shader 40 if geometry shader 42 is inactive) to one or more buffers or memories in resources 50. Data streamed out to resources 50 by stream-out stage 43 can be read back into graphics processing pipeline 30 in a subsequent rendering pass or can be copied for use by another processor (e.g., another GPU or processor).

Rasterizer 44 transforms the output primitives from the tessellation pipeline and/or geometry shader 42 from 3D space into pixel values in 2D space. These pixel values may then be displayed (e.g., on display 8 of FIG. 1). During rasterization, rasterizer 44 converts each primitive into pixels, while interpolating per-vertex values across each primitive. Rasterization includes clipping vertices to the view frustum, performing a divide by z to provide perspective, and mapping primitives to a 2D viewport.

Pixel shader 46 is an optional programmable processor that may be configured to perform further operations on the pixels, such as depth test, clipping, scissoring, blending, etc. The output of pixel shader 46 may be stored in frame buffer 10 and may then be displayed on display, such as display 8 (see FIG. 1).

As discussed above, in some circumstances, tessellator 38 will produce degenerated sub-primitives when tessellating a patch. As will be explained below, some sets of tessellation parameters may cause tessellator 38 to produce only degenerated sub-primitives along one edge of a patch. A degenerated sub-primitive is a primitive having two or three vertices that have the same u, v coordinate. Such degenerated sub-primitives will be rejected by a triangle setup engine of GPU 6 if no other stage of graphics processing pipeline 30 will change the coordinates of the degenerated sub-primitive. This is because the degenerated sub-primitive will not contribute to the final scene. For example, a degenerated triangle sub-primitive will appear as a line or point in u,v coordinate space and not contribute to the final scene. Examples of processing stages of graphics processing pipeline 30 that may change the coordinates of a degenerated sub-primitive, and thus may cause the degenerated sub-primitive to contribute to the final scene, include geometry shader 42 and stream-out stage 43. Producing sub-primitives that do not contribute to the final scene is wasteful of GPU internal processing and memory resources and may consume excess power, which is generally undesirable, but particularly undesirable for battery-powered devices.

In view of these drawbacks, this disclosure describes techniques whereby tessellator 38 (or another hardware and/or software structure of GPU 6) is configured to skip a portion (e.g., one or more edges) of tessellating a patch (e.g., an edge of a patch) in order to avoid the unnecessary production of degenerated sub-primitives. In the context of this disclosure, skipping performing tessellation for an edge of a patch may include bypassing tessellation circuitry for an edge of a patch (e.g., a tessellator connectivity and point generator) and proceeding to processing the next edge of the patch and/or proceeding to the next stage of graphics processing pipeline 30. In other examples, skipping performing tessellation for an edge of a patch may include not performing tessellation for an edge of a patch, marking an edge of a patch to indicate the edge should not be processed by tessellator 38, and/or determining to not apply tessellation to the edge of the patch based on the marking associated with the edge. Tessellator 38 may be further configured to discard any degenerated sub-primitives from edges of a patch that were tessellated such that the output sub-primitives of tessellator 38 include no degenerated sub-primitives. Not producing degenerated sub-primitives in the first place, and removing any degenerated sub-primitives that are produced, saves resources and power at stages further down graphics processing pipeline 30.

In testing, it was observed that tessellator 38 may produce degenerated sub-primitives on the outermost ring of a patch, which is also called a picture frame. In particular, it was discovered that at least some output sub-primitives produced from tessellating one edge of a patch will be degenerated if the following tessellation parameters are true:
1) The patch type is one of quad or triangle (with triangle output sub-primitives).
2) At least one of the three (triangle patch) or four (quad patch) outer tessellation factors is greater than 1.0.
3) The partitioning type is fractional odd
4) An inner tessellation factor in either the u or v direction is 1.0.

In these circumstances, it was discovered that at least some output primitives will be degenerated along the edge matching the direction (u or v) of the inner tessellation factor having the value of 1.0.

Figure 4:
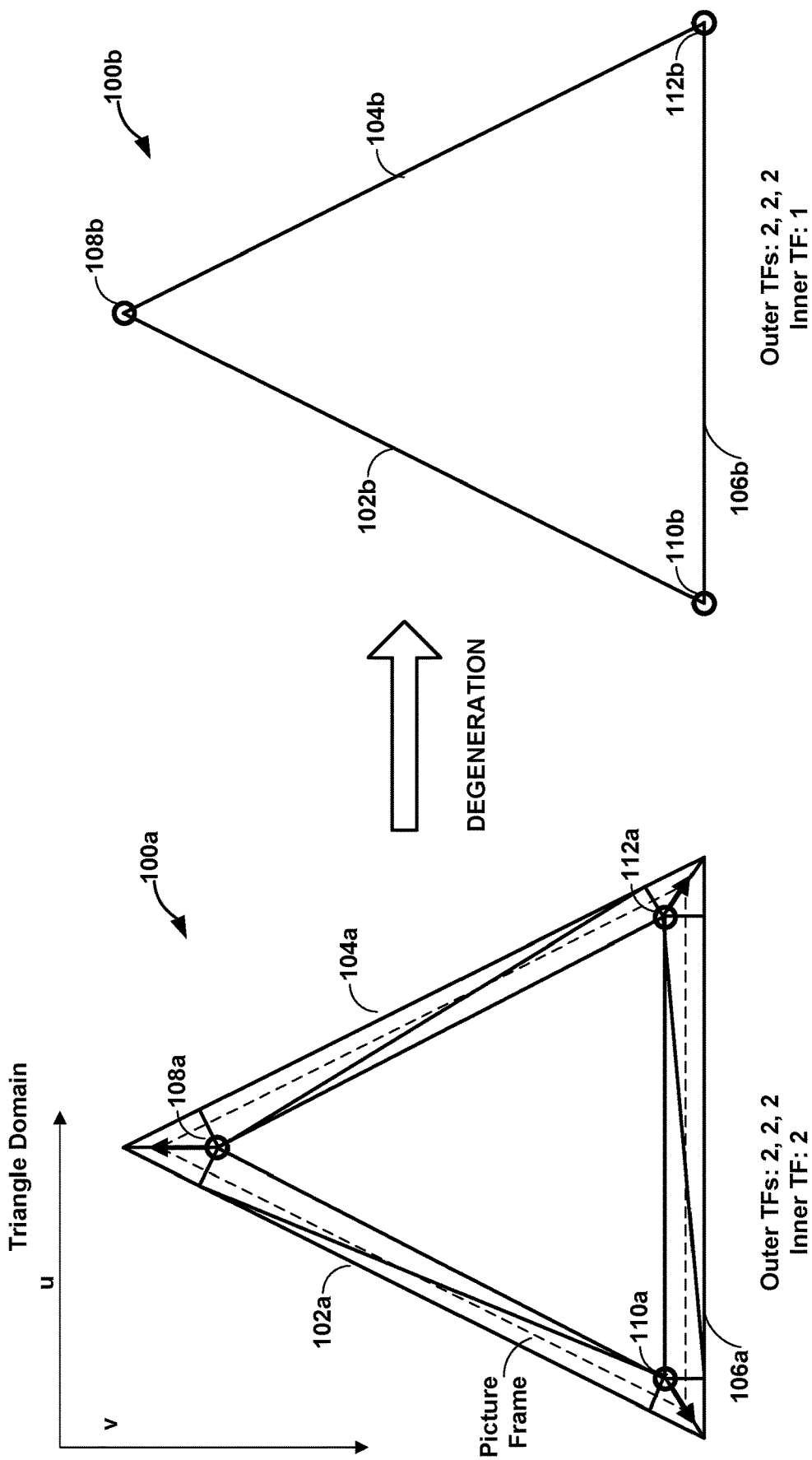
FIG. 4 is a conceptual diagram illustrating degenerated sub-primitives for a triangle patch.

FIG. 4 is a diagram illustrating example degenerated sub-primitives for a triangle patch. In FIG. 4, triangle patch 100a is tessellated according to the outside tessellation factors of (2, 2, 2) and the inner tessellation factor of 2. Each of the respective three outside tessellation factors of (2, 2, 2) corresponds to one of edges 102a, 104a, and 106a of triangle patch 100a. Because the inner tessellation factor is 2, the tessellation parameters for triangle patch 100a will not produce only degenerated sub-primitives along any of edges 102a, 104a, or 106a. As can be seen in FIG. 4, the outside tessellation factors of (2, 2, 2) and the inner tessellation factor of 2 produces an outermost ring (picture frame) of output sub-primitives and a singular triangle on the innermost ring of triangle patch 100a.

Triangle patch 100b is tessellated according to the outside tessellation factors of (2, 2, 2) and the inner tessellation factor of 1. Again, each of the respective three outside tessellation factors of (2, 2, 2) corresponds to one of edges 102b, 104b, and 106b of triangle patch 100b. Because the inner tessellation factor is 1 and at least one of the three outer tessellation factors is greater than 1, the tessellation parameters for triangle patch 100b will produce only degenerated sub-primitives along each of edges 102a, 104a, or 106a. As can be seen in FIG. 4, the outside tessellation factors (2, 2, 2) and the inner tessellation factor of 1 produces no outermost ring (picture frame) of output sub-primitives. Rather, only a single output sub-primitive results, along with degenerated sub-primitives that are not visible in the scene. In effect, when tessellating according to the tessellation parameters of triangle patch 100B, vertices 108b, 110b, and 112b are moved to the edge of triangle patch 100B relative to where they would be using the tessellation parameters of triangle patch 100a (e.g., at vertices 106a, 108a, and 112a). As such, the output sub-primitives along edges 102b, 104b, and 106b have at least two vertices that share the same (u,v) coordinate and are not visible in the scene.

Figure 5:
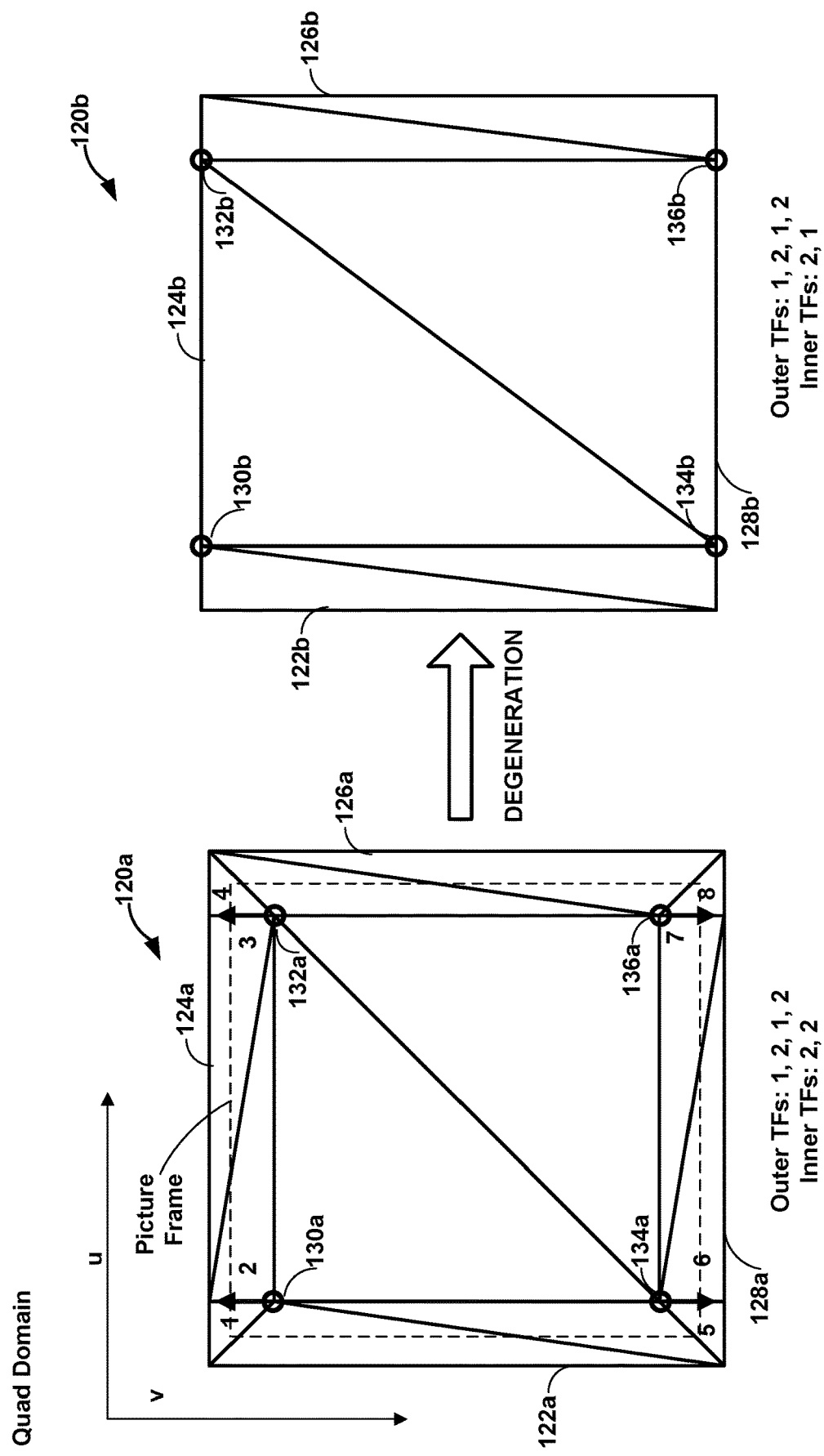
FIG. 5 is a conceptual diagram illustrating degenerated sub-primitives for a quad patch.

FIG. 5 is a diagram illustrating example degenerated sub-primitives for a quad patch. In FIG. 5, quad patch 120a is tessellated according to the outside tessellation factors of (1, 2, 1, 2) and inner tessellation factors of (2, 2). Edges 122a and 126a each have an outer tessellation factor of one. Edges 124a and 128a each have an outer tessellation factor of two. For quad patch 120a, the inner tessellation factor in the u direction is two and the inner tessellation factor for the v direction is also two. Because the inner tessellation factor is 2 in both the u and v direction, the tessellation parameters for quad patch 120*a* will not produce only degenerated sub-primitives along any of edges 122*a*, 124*a*, 126*a*, or 128*a*. As can be seen in FIG. 4, the outside tessellation factors of (1, 2, 1, 2) and the inner tessellation factors of (2, 2) produces an outermost ring (picture frame) of output sub-primitives and two triangle sub-primitives on the innermost ring of quad patch 120*a*.

Quad patch 120*b* is tessellated according to the outside tessellation factors of (1, 2, 1, 2) and the inner tessellation factors of (2, 1). Edges 122*b* and 126*b* each have an outer tessellation factor of one. Edges 124*b* and 128*b* each have an outer tessellation factor of two. For quad patch 120*b*, the inner tessellation factor in the u direction is two and the inner tessellation factor for the v direction is one. In the example of quad patch 120*b*, edges 124*b* and 128*b* have the tessellation parameters that will result in only degenerated sub-primitives. That is, quad patch 120*b* is in the quad domain, is partitioned by the fractional odd type, has at least one outer tessellation factor greater than one (e.g., edges 124*b* and 128*b*) and at least one inner tessellation factor of one. Accordingly, tessellating edges 124*b* and 128*b* will only produce degenerated sub-primitives.

As can be seen in FIG. 5, the outside tessellation factors of (1, 2, 1, 2) and the inner tessellation factors of (2, 1) produces no outermost ring (picture frame) of output sub-primitives. In effect, when tessellating according to the tessellation parameters of quad patch 120B, vertices 130*b*, 132*b*, 134*b*, and 136*b*, are moved to the edge of quad patch 120B relative to where they would be using the tessellation parameters of quad patch 120*a* (e.g., at vertices 130*a*, 132*a*, 134*a*, and 136*a*). As such, the output sub-primitives along edges 124*b* and 128*b* have at least two vertices that share the same (u,v) coordinate and are not visible in the scene.

Figure 6:
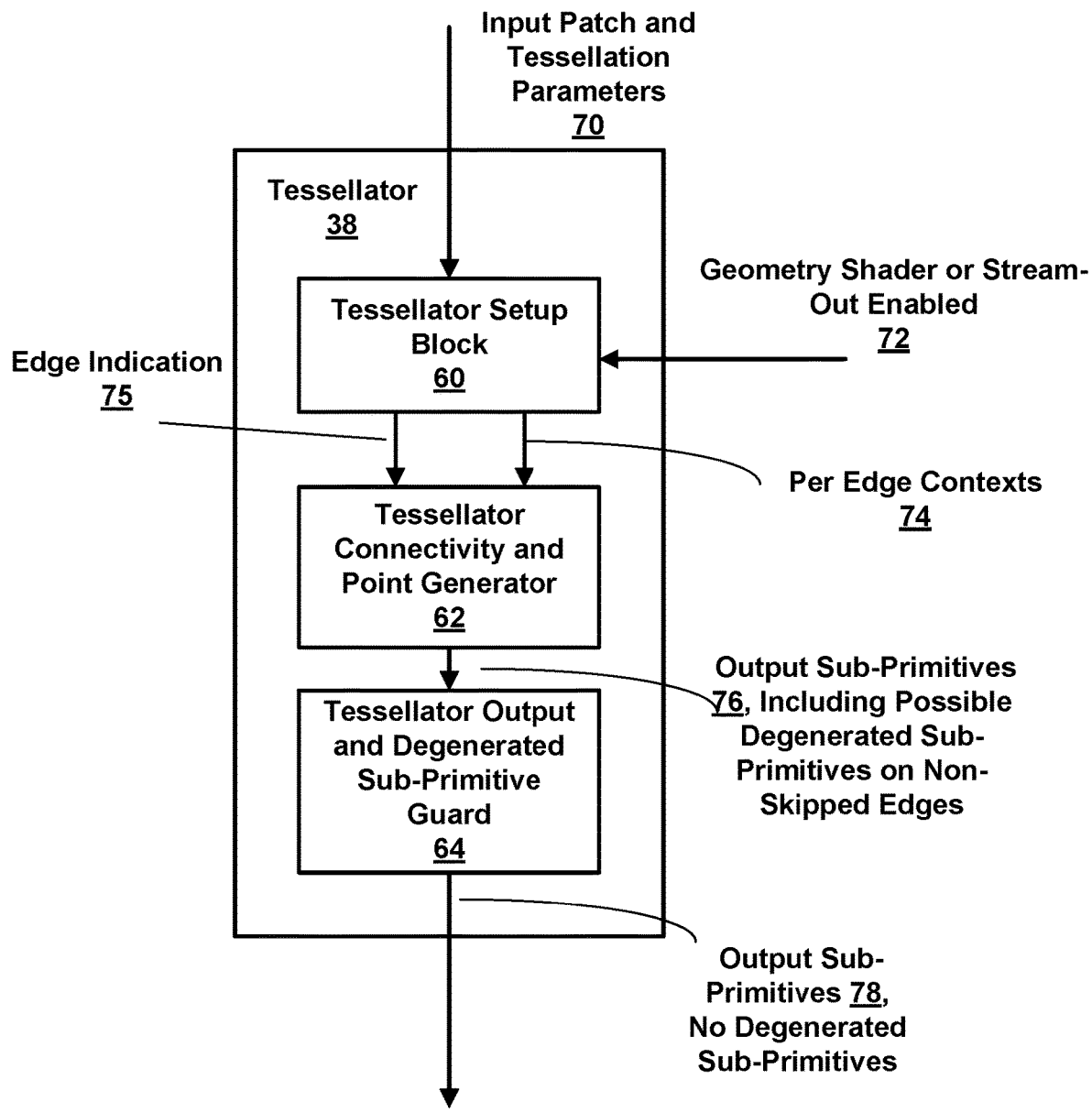
FIG. 6 is a block diagram illustrating an example tessellator according to one example of the disclosure.

FIG. 6 is a block diagram illustrating an example tessellator according to one example of the disclosure. In order to avoid production of degenerated sub-primitives, tessellator 38 may be configured as shown in FIG. 6. Tessellator 38 may be configured to receive the input patch and tessellation parameters 70. As described above, the input patch is defined by control points. The tessellation parameters may include tessellation factors, patch type, and partitioning type. Tessellator setup block 60 may be a hardware circuit that is configured to read in the tessellation parameters and generate per edge contexts of the patch. The context for each edge defines how the edge is to be tessellated given the tessellation parameters. As described above, the tessellation parameters, including the inner and outer tessellation factors, may be determined by hull shader 36 of FIG. 3. The per edge context are points generated on the edge of the patch in accordance with tessellation parameters. Tessellator setup block 60 supplies the per edge contexts 74 to tessellator connectivity and point generator 62.

In accordance with the techniques of this disclosure, tessellator setup block 60 may be configured to determine, based on the tessellation factors and/or other tessellation parameters, whether or not an edge of an outermost ring of the input patch will only produce degenerated sub-primitives. As described above, tessellator 38 will produce at least some degenerated sub-primitives along the edge of the patch under the following tessellation parameters:
1) The patch type is one of quad or triangle (with triangle output sub-primitives).
2) At least one of the three (triangle patch) or four (quad patch) outer tessellation factors is greater than 1.0.
3) The partitioning type is fractional odd
4) An inner tessellation factor in either the u or v direction is 1.0.

If the above conditions are true, tessellator setup block 60 may further analyze the tessellation factors to determine if tessellating an edge of the patch will produce only degenerated sub-primitives.

For patches in the quad domain, tessellator 38 may define outerTF[0] as the outer tessellation factor for a left edge in the v direction (e.g., edge 122*a* in FIG. 5), tessellator 38 may define outerTF[1] as the outer tessellation factor for an upper edge in the u direction (e.g., edge 124*a* in FIG. 5), tessellator 38 may define outerTF[2] as the outer tessellation factor for a right edge in the v direction (e.g., edge 126*a* in FIG. 5), and tessellator 38 may define outerTF[3] as the outer tessellation factor for a lower edge in the u direction (e.g., edge 128*a* in FIG. 5). Also, tessellator 38 may define innerTF[u] as the inner tessellation factor in the u direction and define innerTF[v] as the inner tessellation factor in the v direction.

Accordingly, for patches in the quad domain, tessellator setup block 60 may be configured to determine that tessellation will produce only degenerated sub-primitives along an edge for the following conditions:
outerTF[0/2]=innerTF[v] and innerTF[u]=1.0; or
outerTF[1/3]=innerTF[u] and innerTF[v]=1.0.

For patches in the triangle domain, tessellator 38 may define outerTF[0] as the outer tessellation factor for a first edge of the triangle patch (e.g., edge 102*a* in FIG. 4), tessellator 38 may define outerTF[1] as the outer tessellation factor for a second edge of the triangle patch (e.g., edge 104*a* in FIG. 4), and tessellator 38 may define outerTF[2] as the outer tessellation factor for a third edge of the triangle patch (e.g., edge 106*a* in FIG. 4). Also, tessellator 38 may define innerTF as the inner tessellation factor.

Accordingly, for patches in the triangle domain, tessellator setup block 60 may be configured to determine that tessellation will produce only degenerated sub-primitives along an edge for the following condition:
(outerTF[0]=1.0 or outerTF[1]=1.0 or outerTF[2]=1.0) and innerTF=1.0. If these conditions are true, the corresponding edge of the triangle patch (e.g., edge[0], edge [1], and/or edge[2]), will only produce degenerated sub-primitives when tessellated.

Note that in some examples, tessellator setup block 60 may not need to check the values of the outer tessellation factors because it may be a requirement that at least one edge of a triangle patch has an outer tessellation factor of 1.0 for any tessellation to occur. In that example, tessellator setup block 60 may need only check the value of the inner tessellation factors to determine if tessellating an edge of a triangle patch will produce only degenerated sub-primitives.

If any of these conditions are met, for either a quad patch or a triangle patch, tessellator setup block 60 may be configured to mark the edge as to be skipped for tessellation by sending edge indication 75 to tessellator connectivity and point generator 62. Edge indication 75 indicates that tessellator connectivity and point generator 62 should not perform tessellation on the indicated edge. That is, tessellator connectivity and point generator 62 may be configured to determine whether or not to tessellate an edge of a patch based on the value of edge indication 75. For edges not having edge indication 75 indicating tessellation should be skipped (e.g., either a value indicating tessellation is to be performed or no value of edge indication 75 is sent), tessellator connectivity and point generator 62 would perform the tessellation as described above. Tessellator connectivity and point generator 62 generates output sub-primitives 76 defined by points generated in (u,v) space. Output sub-primitives 76 may include possible degenerated sub-primitives on non-skipped edges.

In some examples, tessellator setup block 60 may be configured to generate edge indication 75 as a 4-bit signal. Each bit of the 4-bit signal would be associated with one of the edges of the quad patch. The last bit of the 4-bit signal would simply not be used for a triangle patch. A zero value for a bit in the 4-bit signal may indicate that tessellation should be performed on the edge, and a one value for a bit in the 4-bit signal may indicate that tessellation should be skipped on that edge, or vice versa. However, it should be understood that any method of indicating which edges to skip in the performance of tessellation may be used.

Other combinations of tessellation parameters may produce some, but not exclusively, degenerated sub-primitives along some edges. That is, for some sets of tessellation parameters other than the combination described above, tessellation an edge of a patch will produce at least one or more normal sub-primitives (e.g., non-degenerated sub-primitives). As such, it is preferable to not skip tessellation along such edges, as the tessellation process for such edges produced sub-primitives that contribute to the final scene. However, it is still preferable to remove any degenerated sub-primitives that are produced.

Accordingly, in accordance with another aspect of this disclosure, tessellator 38 may include a tessellator output and degenerated sub-primitive guard circuit 64. In addition to outputting the vertices of the generated output sub-primitives 78 to domain shader 40, tessellator output and degenerated sub-primitive guard circuit 64 may be configured to check the vertices of each output sub-primitive 78. In an example, if two or more of the vertices of an output sub-primitive 78 have the same (u,v) coordinate, tessellator output and degenerated sub-primitive guard circuit 64 identifies the sub-primitive as being degenerated and may discard the degenerated sub-primitive before outputting to domain shader 40. In this way, processing cycles and power are not wasted on processing degenerated sub-primitives in any downstream stages of graphics processing pipeline 30.

In the example of FIG. 6, tessellator 38 is configured to determine which edges will produce only degenerated sub-primitives and configured to provide an edge indication to tessellator connectivity and point generator 62. However, it is not required that tessellator 38 be configured to perform such determination. In other examples, hull shader 36 may be configured to execute software that performs such a determination and edge indication generation. In other examples, another programmable and/or fixed-function circuit within GPU 6 may be configured to determine which edges will produce only degenerated sub-primitives and provide an edge indication to tessellator connectivity and point generator 62. In still other examples, another processor, e.g., processor 4, may be configured to determine which edges will produce only degenerated sub-primitives and provide an edge indication to tessellator connectivity and point generator 62.

Likewise, in the example of FIG. 6, tessellator 38 is configured to check output sub-primitives to identify any degenerated sub-primitives that were produced and to discard the degenerated sub-primitives. However, it is not required that tessellator 38 be configured to perform such checking and discard techniques. In other examples, domain shader 40 may be configured to execute software that checks output sub-primitives to identify any degenerated sub-primitives that were produced and to discard the degenerated sub-primitives. In other examples, another programmable and/or fixed-function circuit within GPU 6 may be configured to check output sub-primitives to identify any degenerated sub-primitives that were produced and to discard the degenerated sub-primitives. In still other examples, another processor, e.g., processor 4, may be configured to check output sub-primitives to identify any degenerated sub-primitives that were produced and to discard the degenerated sub-primitives.

In some examples, it may desirable to not skip tessellating edges identified as producing only degenerated sub-primitives or discarding output sub-primitives identified as being degenerated. For example, some processing stages of graphics processing pipeline 30 may be configured to change the position of the vertices of primitives in ways that contribute to the final scene. One example of such a stage is optional geometry shader 42. Geometry shader 42 may perform processing on degenerated sub-primitives in ways that contribute to the final scene. Accordingly, in one example of the disclosure, tessellator 38 is configured to disable the above-described techniques for eliminating degenerated sub-primitives when geometry shader 42 is enabled. In other words, tessellator 38 may be configured to determine, based on the tessellation factors, that a first edge of an outermost ring of a first patch will produce only degenerated sub-primitives in the case that a geometry shader stage and a stream-out stage of a graphics processing pipeline configured to process the first patch are disabled. Tessellator setup block 60 may receive a geometry shader or stream-out enabled indication 72. Geometry shader or stream-out enabled indication 72 is positive if either geometry shader 42 or stream-out stage 43 is enabled. Geometry shader or stream-out enabled indication 72 is negative if geometry shader 42 and stream-out stage 43 are both disabled. Based on a negative value for geometry shader or stream-out enabled indication 72, tessellator 38 may be configured to perform the tessellation skipping techniques described above. In another example, tessellator 38 may be configured to determine, for a second patch, that at least one of the geometry shader stage or the stream-out stage of the graphics processing pipeline configured to process the second patch is enabled based on a positive value for geometry shader or stream-out enabled indication 72. In response to this determination, tessellator 38 may be configured to tessellate all edges of the second patch.

Likewise, tessellator 38 is configured to disable the above-described techniques for eliminating degenerated sub-primitives when optional stream-out stage 43 is enabled, as indicated by geometry shader or stream-out enabled indication 72. This is because stream-out stage 43 saves vertex information to memory for later processing. Such later processing may cause a degenerated sub-primitive to contribute to the final scene.

Testing has shown that the techniques of this disclosure for skipping tessellation of an edge of a patch may result in 40%-98% of degenerated sub-primitives not being produced. In addition, by checking the output of tessellator 38 and discarding any remaining degenerated sub-primitives, 100% of degenerated sub-primitives are removed at the output of tessellator 38. Techniques for removal of degenerated sub-primitives as described in this disclosure may significantly improve the way in which a graphics processor operates, e.g., in terms of reducing processing overhead, memory use and power consumption.

Figure 7:
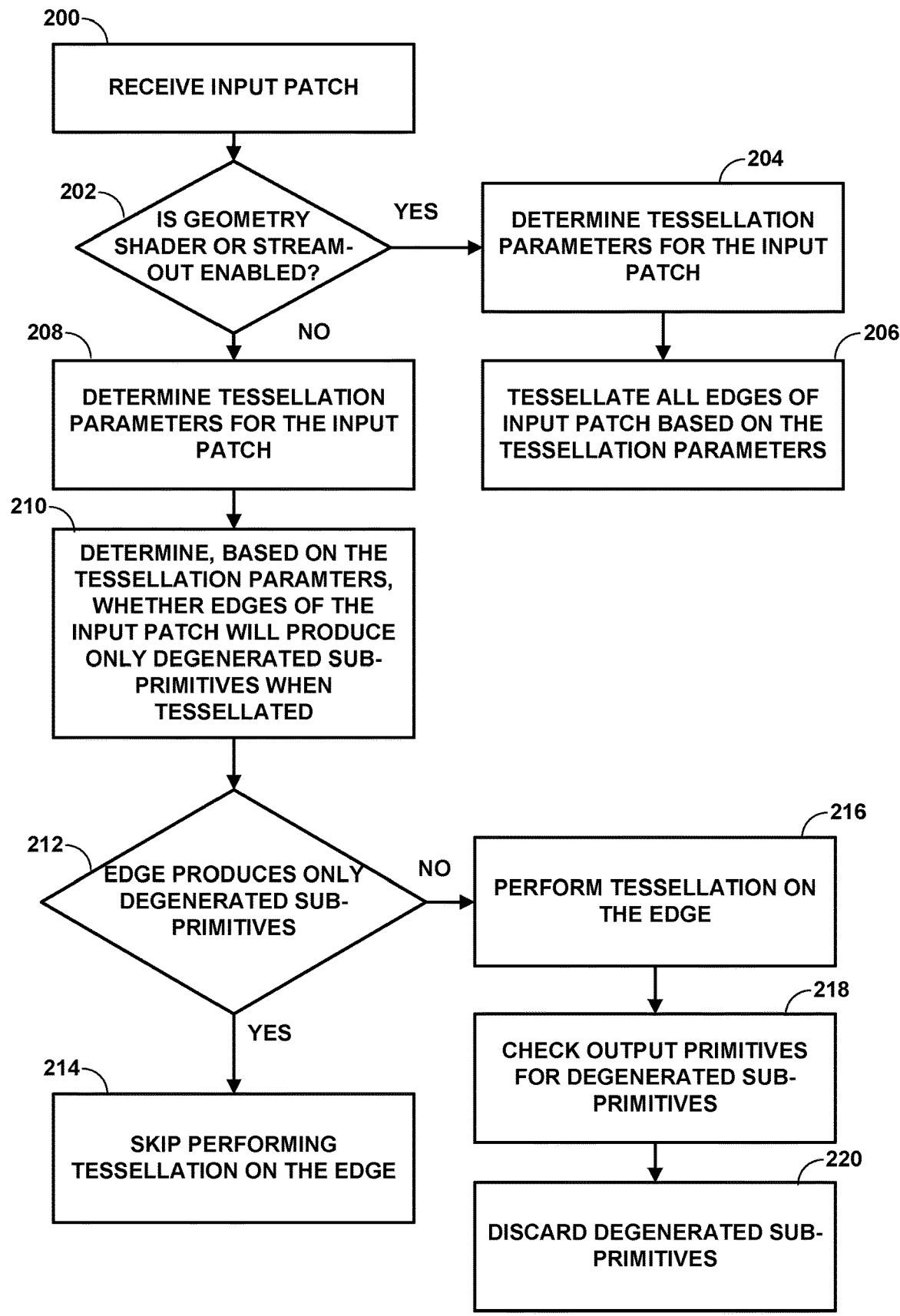
FIG. 7 is a flowchart illustrating an example tessellation method according to the techniques of the disclosure.

FIG. 7 is a flowchart illustrating an example tessellation method according to the techniques of the disclosure. The techniques of FIG. 7 may be performed by one or more hardware components (e.g., shader processor or fixed function circuit) of GPU 6 or any other processor configured to perform tessellation of graphics data (e.g., a CPU such as processor 4).

GPU 6 may be configured to receive an input patch of graphics data to be tessellated (200). GPU 6 may be configured to determine if at least one of a geometry shader stage (e.g., geometry shader 42) or stream-out stage (e.g., stream-out stage 43) is enabled (202). If yes, GPU 6 may be configured to determine tessellation parameters for the input patch (204) and tessellate all edges of the input patch based on the tessellation parameters (206).

If GPU 6 determines that neither a geometry shader or stream-out stage is enabled (202), GPU 6 may be configured to determine tessellation parameters for the input patch (208). Tessellation parameters may include both inner and outer tessellation factors, as well as patch type and partitioning type. In one example, to determine the tessellation factors for the input patch, GPU 6 may be configured to determine a respective outer tessellation factor for each edge of the input patch and determine one or more inner tessellation factors for the input patch. GPU 6 may then determine, based on the tessellation parameters, whether edges of the input patch will produce only degenerated sub-primitives when tessellated (210). In one example, GPU 6 may determine, based on the tessellation factors, that a first edge of an outermost ring of the input patch will produce only degenerated sub-primitives. For example, to determine that the first edge of the outermost ring of the input patch will produce only degenerated sub-primitives, GPU 6 may be configured to determine that the first edge of the outermost ring of the input patch will produce only degenerated sub-primitives based on the respective outer tessellation factor for the first edge, the one or more inner tessellation factors for the input patch, a patch type of the input patch, and a partitioning type of the input patch.

As described above, GPU 6 will produce at least some degenerated sub-primitives along the first edge of the patch under the following tessellation parameter conditions:
1) The patch type is one of quad or triangle (with triangle out sub-primitives).
2) At least one of the three (triangle patch) or four (quad patch) outer tessellation factors are greater than 1.0.
3) The partitioning type is fractional odd
4) An inner tessellation factor in either the u or v direction is 1.0.

For patches in the quad domain, GPU 6 may be configured to determine that tessellation will produce only degenerated sub-primitives along an edge for the following conditions:
outerTF[0/2]=innerTF[v] and innerTF[u]=1.0; or
outerTF[1/3]=innerTF[u] and innerTF[v]=1.0.

For patches in the triangle domain, GPU 6 may be configured to determine that tessellation will produce only degenerated sub-primitives along and edge for the following condition:
(outerTF[0]=1.0 or outerTF[1]=1.0 or outerTF[2]=1.0) and innerTF=1.0. If these conditions are true, the corresponding edge of the triangle patch (e.g., edge[0], edge [1], and/or edge[2]), will only produce degenerated sub-primitives when tessellated.

If GPU 6 determines that an edge of the input patch produces only degenerated sub-primitives (212), GPU 6 may be configured to skip performing tessellation for the edge (214). For example, GPU 6 may mark an edge with an edge indication in the case that GPU 6 determines that the edge of the input patch produces only degenerated sub-primitives. GPU 6 may then skip performing tessellation for marked edges. In the context of this disclosure, skipping performing tessellation for an edge of a patch may include bypassing tessellation circuitry for an edge of a patch (e.g., tessellator connectivity and point generator 62) and proceeding to processing the next edge of the patch and/or proceeding to the next stage of a graphics processing pipeline (e.g., domain shader 40). If GPU 6 determines that an edge of the input patch does not produce only degenerated sub-primitives (212), GPU 6 may be configured to perform tessellation on the edge (216). That is, GPU 6 may determine that an edge of the input patch produces at least some (i.e., one or more) normal sub-primitives when tessellated.

GPU 6 may then check each of the output primitives for the tessellated edge to determine if any of the output primitives are degenerated sub-primitives (218), and discard, based on the checking, the degenerated sub-primitives (220).

In one or more examples, the functions described above may be implemented in hardware, software, firmware, or any combination thereof. If implemented in software, the functions may be stored as one or more instructions or code on an article of manufacture including a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can include RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray™ disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some examples, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method of graphics processing, the method comprising:
   determining tessellation factors for a first patch of graphics data;

determining, based on the tessellation factors and using a processor, that a first edge of an outermost ring of the first patch will produce only degenerated sub-primitives;

skipping performing tessellation for the first edge;

determining that a second edge of the outermost ring of the first patch will produce at least some normal sub-primitives; and performing tessellation for the second edge to produce output primitives.

2. The method of claim 1, wherein determining the tessellation factors for the first patch comprises:

determining a respective outer tessellation factor for each edge of the first patch; and determining one or more inner tessellation factors for the first patch.

3. The method of claim 2, wherein determining that the first edge of the outermost ring of the first patch will produce only degenerated sub-primitives comprises:

determining that the first edge of the outermost ring of the first patch will produce only degenerated sub-primitives based on the respective outer tessellation factor for the first edge, the one or more inner tessellation factors for the first patch, a patch type of the first patch, and a partitioning type of the first patch.

4. The method of claim 3, wherein the first edge is in the u direction or the v direction in a (u,v) coordinate system, the method further comprising:

determining that the first edge of the outermost ring of the first patch will produce at least some degenerated sub-primitives in the case that the patch type is quad or triangle, the partitioning type is fractional odd, the respective outer tessellation factor for the first edge is greater than 1.0, and that the inner tessellation factor for the u direction is 1.0 or the inner tessellation factor for the v direction is 1.0.

5. The method of claim 1, wherein determining, based on the tessellation factors, that the first edge of the outermost ring of the first patch will produce only degenerated sub-primitives is performed by a tessellator setup block of a tessellator stage in a graphics processing unit, the method further comprising:

sending, in response to determining that the first edge of the outermost ring of the first patch will produce only degenerated sub-primitives, an indication corresponding to the first edge from the tessellator setup block to a tessellator connectivity and point generator of the tessellator stage, the indication indicating the tessellation of the first edge is to be skipped, wherein skipping performing tessellation for the first edge is based on the indication.

6. The method of claim 1, further comprising:

checking each of the output primitives for the second edge to determine if any of the output primitives are degenerated sub-primitives; and discarding, based on the checking, the degenerated sub-primitives.

7. The method of claim 1, wherein determining, based on the tessellation factors, that the first edge of the outermost ring of the first patch will produce only degenerated sub-primitives is based on determining that a geometry shader stage and a stream-out stage of a graphics processing pipeline configured to process the first patch are disabled.

8. The method of claim 7, further comprising:

determining, for a second patch, that at least one of the geometry shader stage or the stream-out stage of the graphics processing pipeline configured to process the second patch is enabled; and tessellating all edges of the second patch.

9. An apparatus configured for graphics processing, the apparatus comprising:

a memory configured to store graphics data; and one or more processors configured to process the graphics data, the one or more processors configured to:

determine tessellation factors for a first patch of the graphics data;

determine, based on the tessellation factors, that a first edge of an outermost ring of the first patch will produce only degenerated sub-primitives;

skip performing tessellation for the first edge;

determine that a second edge of the outermost ring of the first patch will produce at least some normal sub-primitives; and perform tessellation for the second edge to produce output primitives.

10. The apparatus of claim 9, wherein to determine the tessellation factors for the first patch, the one or more processors are further configured to:

determine a respective outer tessellation factor for each edge of the first patch; and determine one or more inner tessellation factors for the first patch.

11. The apparatus of claim 10, wherein to determine that the first edge of the outermost ring of the first patch will produce only degenerated sub-primitives, the one or more processors are further configured to:

determine that the first edge of the outermost ring of the first patch will produce only degenerated sub-primitives based on the respective outer tessellation factor for the first edge, the one or more inner tessellation factors for the first patch, a patch type of the first patch, and a partitioning type of the first patch.

12. The apparatus of claim 11, wherein the first edge is in the u direction or the v direction in a (u,v) coordinate system, and wherein the one or more processors are further configured to:

determine that the first edge of the outermost ring of the first patch will produce at least some degenerated sub-primitives in the case that the patch type is quad or triangle, the partitioning type is fractional odd, the respective outer tessellation factor for the first edge is greater than 1.0, and that the inner tessellation factor for the u direction is 1.0 or the inner tessellation factor for the v direction is 1.0.

13. The apparatus of claim 9, wherein the one or more processors include a graphics processing unit, the graphics processing unit comprising a tessellator stage having a tessellator setup block, and a tessellator connectivity and point generator, wherein the tessellator setup block is configured to determine, based on the tessellation factors, that the first edge of the outermost ring of the first patch will produce only degenerated sub-primitives, and send, in response to determining that the first edge of the outermost ring of the first patch will produce only degenerated sub-primitives, an indication corresponding to the first edge to the tessellator connectivity and point generator, the indication indicating the tessellation of the first edge is to be skipped, and wherein the tessellator connectivity and point generator is configured to skip performing tessellation for the first edge based on the indication.

14. The apparatus of claim 9, wherein the one or more processors are further configured to:
  check each of the output primitives for the second edge to determine if any of the output primitives are degenerated sub-primitives; and
  discard, based on the checking, the degenerated sub-primitives.

15. The apparatus of claim 9, wherein the one or more processors are further configured to:
  determine, based on the tessellation factors, that the first edge of the outermost ring of the first patch will produce only degenerated sub-primitives in the case that a geometry shader stage and a stream-out stage of a graphics processing pipeline configured to process the first patch are disabled.

16. The apparatus of claim 15, wherein the one or more processors are further configured to:
  determine, for a second patch of the graphics data, that at least one of the geometry shader stage or the stream-out stage of the graphics processing pipeline configured to process the second patch is enabled; and
  tessellate all edges of the second patch.

17. The apparatus of claim 9, wherein the graphics processing unit is part of a mobile device.

18. An apparatus for graphics processing, the apparatus comprising:
  means for determining tessellation factors for a first patch of graphics data;
  means for determining, based on the tessellation factors, that a first edge of an outermost ring of the first patch will produce only degenerated sub-primitives;
  means for skipping performing tessellation for the first edge;
  means for determining that a second edge of the outermost ring of the first patch will produce at least some normal sub-primitives; and
  means for performing tessellation for the second edge to produce output primitives.

19. The apparatus of claim 18, wherein the means for determining the tessellation factors for the first patch comprises:
  means for determining a respective outer tessellation factor for each edge of the first patch; and
  means for determining one or more inner tessellation factors for the first patch.

20. The apparatus of claim 19, wherein the means for determining that the first edge of the outermost ring of the first patch will produce only degenerated sub-primitives comprises:
  means for determining that the first edge of the outermost ring of the first patch will produce only degenerated sub-primitives based on the respective outer tessellation factor for the first edge, the one or more inner tessellation factors for the first patch, a patch type of the first patch, and a partitioning type of the first patch.

21. The apparatus of claim 18, further comprising:
  means for checking each of the output primitives for the second edge to determine if any of the output primitives are degenerated sub-primitives; and
  means for discarding, based on the checking, the degenerated sub-primitives.

22. A non-transitory computer-readable storage medium storing instructions that, when executed, causes one or more processors of a device for graphics processing to:
  determine tessellation factors for a first patch of graphics data;
  determine, based on the tessellation factors, that a first edge of an outermost ring of the first patch will produce only degenerated sub-primitives;
  skip performing tessellation for the first edge;
  determine that a second edge of the outermost ring of the first patch will produce at least some normal sub-primitives; and
  perform tessellation for the second edge to produce output primitives.

23. The non-transitory computer-readable storage medium of claim 22, wherein to determine the tessellation factors for the first patch, the instructions further cause the one or more processors to:
  determine a respective outer tessellation factor for each edge of the first patch; and
  determine one or more inner tessellation factors for the first patch.

24. The non-transitory computer-readable storage medium of claim 23, wherein to determine that the first edge of the outermost ring of the first patch will produce only degenerated sub-primitives, the instructions further cause the one or more processors to:
  determine that the first edge of the outermost ring of the first patch will produce only degenerated sub-primitives based on the respective outer tessellation factor for the first edge, the one or more inner tessellation factors for the first patch, a patch type of the first patch, and a partitioning type of the first patch.

25. The non-transitory computer-readable storage medium of claim 22, wherein the instructions further cause the one or more processors to:
  check each of the output primitives for the second edge to determine if any of the output primitives are degenerated sub-primitives; and
  discard, based on the checking, the degenerated sub-primitives.

* * * * *